United States Patent
Keidar et al.

(10) Patent No.: US 8,218,568 B2
(45) Date of Patent: Jul. 10, 2012

(54) METHOD AND APPARATUS FOR SYNCHRONIZATION OF RF MODULE ACTIVITIES

(75) Inventors: Ron Keidar, Hafia (IL); Eitan Yacobi, Zichron-Ya'akov (IL); Haim Weissmann, Hafia (IL)

(73) Assignee: QUALCOMM Incorporated, San Diego, CA (US)

( * ) Notice: Subject to any disclaimer, the term of this patent is extended or adjusted under 35 U.S.C. 154(b) by 804 days.

(21) Appl. No.: 12/172,116

(22) Filed: Jul. 11, 2008

(65) Prior Publication Data

US 2010/0008336 A1    Jan. 14, 2010

(51) Int. Cl.
*H04B 1/40* (2006.01)
*H04W 88/06* (2009.01)

(52) U.S. Cl. ........................................ 370/465

(58) Field of Classification Search .................. 370/465, 370/466
See application file for complete search history.

(56) References Cited

U.S. PATENT DOCUMENTS

| | | | |
|---|---|---|---|
| 2005/0058149 A1* | 3/2005 | Howe | 370/428 |
| 2005/0172023 A1* | 8/2005 | Brelin | 709/224 |
| 2006/0292987 A1 | 12/2006 | Ophir et al. | |
| 2007/0232358 A1 | 10/2007 | Sherman | |
| 2007/0298717 A1* | 12/2007 | Palin et al. | 455/63.1 |
| 2008/0285596 A1* | 11/2008 | Hady et al. | 370/503 |

FOREIGN PATENT DOCUMENTS

| | | |
|---|---|---|
| EP | 1432154 A2 | 6/2004 |
| EP | 1626541 A2 | 2/2006 |
| EP | 1653672 A1 | 5/2006 |
| WO | WO2007008981 | 1/2007 |
| WO | WO2008001272 | 1/2008 |
| WO | WO2008041071 | 4/2008 |

OTHER PUBLICATIONS

Chiasserini C. F., et al., "Coexistence mechanisms for interference mitigation between IEEE 80211 WLANs and bluetooth, (XP010593620 ISBN: 0-7803-7476-2 p. 592, right-hand column, line 4-p. 594, left hand column, line 1)," Proceedings IEEE Infocom 2002. The Conference on Computer Communications. 21st. Annual Joint Conference of the IEEE Computer and Communications Societies. New York, NY, Proceedings IEEE Infocom. The Conference on Computer Communica, 2002, 1 (3), 590-598.

International Search Report and the Written Opinion—PCT/US2009/050153, International Search Authority—European Patent Office—Dec. 28, 2009.

Ophir L et al: "Wi-Fi (IEEE802.il) and Bluetooth coexistence: issues and solutions" Personal, Indoor and Mobile Radio Communications, 2004. PIMRC 2004. 15 th IEEE International Symposium on Barcelona, Spain Sep. 5-8, 2004, Piscataway, NJ, USA,IEEE, Piscataway, NJ, USA, vol. 2, Sep. 5, 2004, pp. 847-852, XP010753961 ISBN: 978-0-7803-8523-8 the whole document.

* cited by examiner

*Primary Examiner* — Melvin Marcelo
(74) *Attorney, Agent, or Firm* — Stanton Braden

(57) ABSTRACT

An apparatus and method for synchronizing RF activities comprising receiving a notification relating to transmission activities; determining at least one of a plurality of RF modules to relay the notification; and relaying the notification to at least one of the plurality of RF modules.

77 Claims, 7 Drawing Sheets

METHOD AND APPARATUS FOR SYNCHRONIZATION OF RF MODULE ACTIVITIES

FIELD

This disclosure relates generally to apparatus and methods for synchronization of radio frequency (RF) module activities. More particularly, the disclosure relates to synchronization of RF module transmissions and receptions.

BACKGROUND

Modern cellular and wireless devices may contain many receivers and transmitters using various wireless technologies each with their own RF module. These wireless technologies include code division multiple access (CDMA), universal mobile telecommunications system (UMTS), wireless local area networks (WLAN), BlueTooth, worldwide interoperability for microwave access (WiMAX), Broadcast TV, global positioning system (GPS), etc. Each such receiver may have deteriorated performance due to interference arising from concurrent transmission from the RF module of another technology. Without synchronization of RF activities, the RF modules each operate independently, increasing the probability of interfering with each other. In addition, if two RF modules transmit simultaneously, they may interfere with or jam each other at the receivers. Furthermore, if the transmitters transmit simultaneously, the peak aggregated energy demand may impose a high load on the battery and electrical power system. Alternatively, the electrical power level may drop and cause a transmission failure.

Previously, some solutions have been offered which are compatible with two closely related wireless technologies. But, the previous solutions are limited to two closely related wireless technologies and do not offer a complete solution for all wireless technologies. One previous solution creates linkages between technologies, but is not scalable and not maintainable. Other previous solutions require jammer detectors or consume more power to overcome internal jammers.

SUMMARY

Disclosed is an apparatus and method for synchronization of radio frequency (RF) module activities, particularly for RF transmissions and receptions.

According to one aspect, a method for synchronizing RF activities comprising receiving a notification relating to transmission activities; determining at least one of a plurality of RF modules to relay the notification; and relaying the notification to at least one of the plurality of RF modules.

According to another aspect, a mobile terminal with features for synchronizing RF activities comprising a plurality of RF modules; and a RF activity bulletin board wherein the RF activity bulletin board receives a notification relating to transmission activities, determines at least one of the plurality of RF modules to relay the notification, and relays the notification to at least one of the plurality of RF modules.

According to another aspect, a mobile terminal with features for synchronizing RF activities comprising a processor and a memory wherein the memory containing program code executable by the processor for performing the following: receiving a notification relating to transmission activities; determining at least one of a plurality of RF modules to relay the notification; and relaying the notification to at least one of the plurality of RF modules.

According to another aspect, a mobile terminal with features for synchronizing RF activities comprising means for receiving a notification relating to transmission activities; means for determining at least one of a plurality of RF modules to relay the notification; and means for relaying the notification to at least one of the plurality of RF modules.

According to another aspect, a computer-readable medium including program code thereon, which when executed by at least one computer implement a method comprising program code for receiving a notification relating to transmission activities; program code for determining at least one of a plurality of RF modules to relay the notification; and program code for relaying the notification to at least one of the plurality of RF modules.

The present disclosure overcomes or minimizes internal RF module compatibility issues. Advantages include increased concurrency performance across all technologies (not just among pair of technologies); simpler and more scalable architecture; lower maintenance in porting between targets; no dependency between technologies; no need for jammer compensation (allowing for simpler and more cost effective designs); better power consumption by allowing the receiver to be less linear; more integrated solution; reduced battery demand for peak energies; postponement of transmission for improved concurrency with other RF modules; etc. In short, the present disclosure provides a holistic compatibility solution for all RF technologies.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the processes or methodologies are shown and described as a series of acts, it is to be understood and appreciated that they are not limited by the order of acts, as some acts may, in accordance with one or more aspects, occur in different orders and/or concurrently with other acts from that shown and described herein. For example, those skilled in the art will understand and appreciate that a process or methodology could alternatively be represented as a series of interrelated states or events, such as in a state diagram. Moreover, not all illustrated acts may be required to implement a process or methodology in accordance with one or more aspects.

Figure 1:
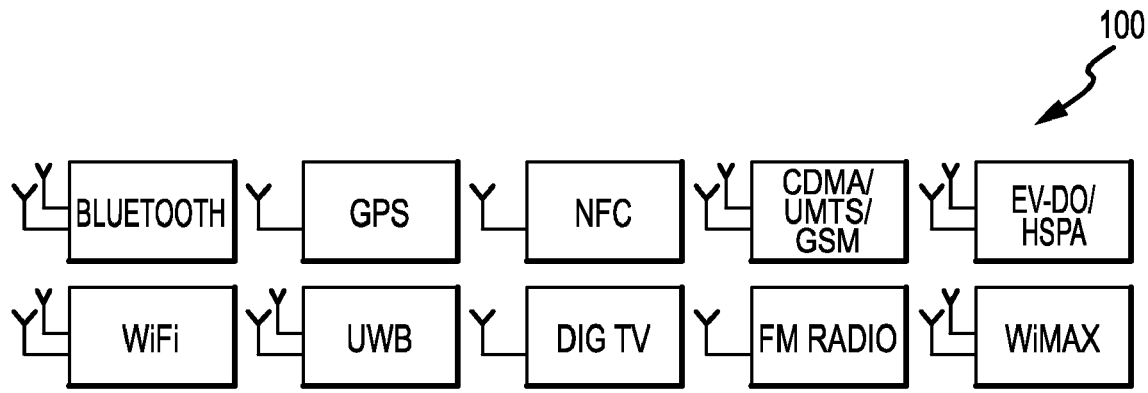
FIG. 1 shows an example of a wireless communication system comprising a single mobile terminal with a plurality of RF modules, each with its dedicated antennas.

FIG. 1 shows an example of a wireless communication system comprising a single mobile terminal 100 with a plurality of RF modules, each with its dedicated antennas. In one example, the plurality of RF modules are co-located on a single printed circuit board (PCB). Shown in FIG. 1, the RF modules are Bluetooth, Global Positioning System (GPS), Near Field Communications (NFC), Code Division Multiple Access/Universal Mobile Telecommunications Systems/Global System for Mobile communications (CDMA/UMTS/GSM), Evolution Data Optimized/High Speed Packet Access (EVDO/HSPA), Wi-Fi™, Ultra Wide Band (UWB), Digital TV, FM Radio, and Worldwide Interoperability for Microwave Access (WiMAX). In the mobile terminal 100, simultaneous compatible operations of these multiple RF modules are required. Mesh architectures are at a disadvantage since they are not scalable, have difficult interfacing requirements; have more non-recurring expenses (NRE) and/or a longer time-to-market (TTM), etc. For example, with a mesh architecture, to add an additional RF module would require full mesh maintenance, i.e., a new connection from the new RF module to each of the existing RF modules. Although FIG. 1 shows that each RF module has dedicated antenna(s), one skilled in the art would understand that some RF modules may share the same antenna(s) without affecting the spirit or scope of the present disclosure.

Figure 2:
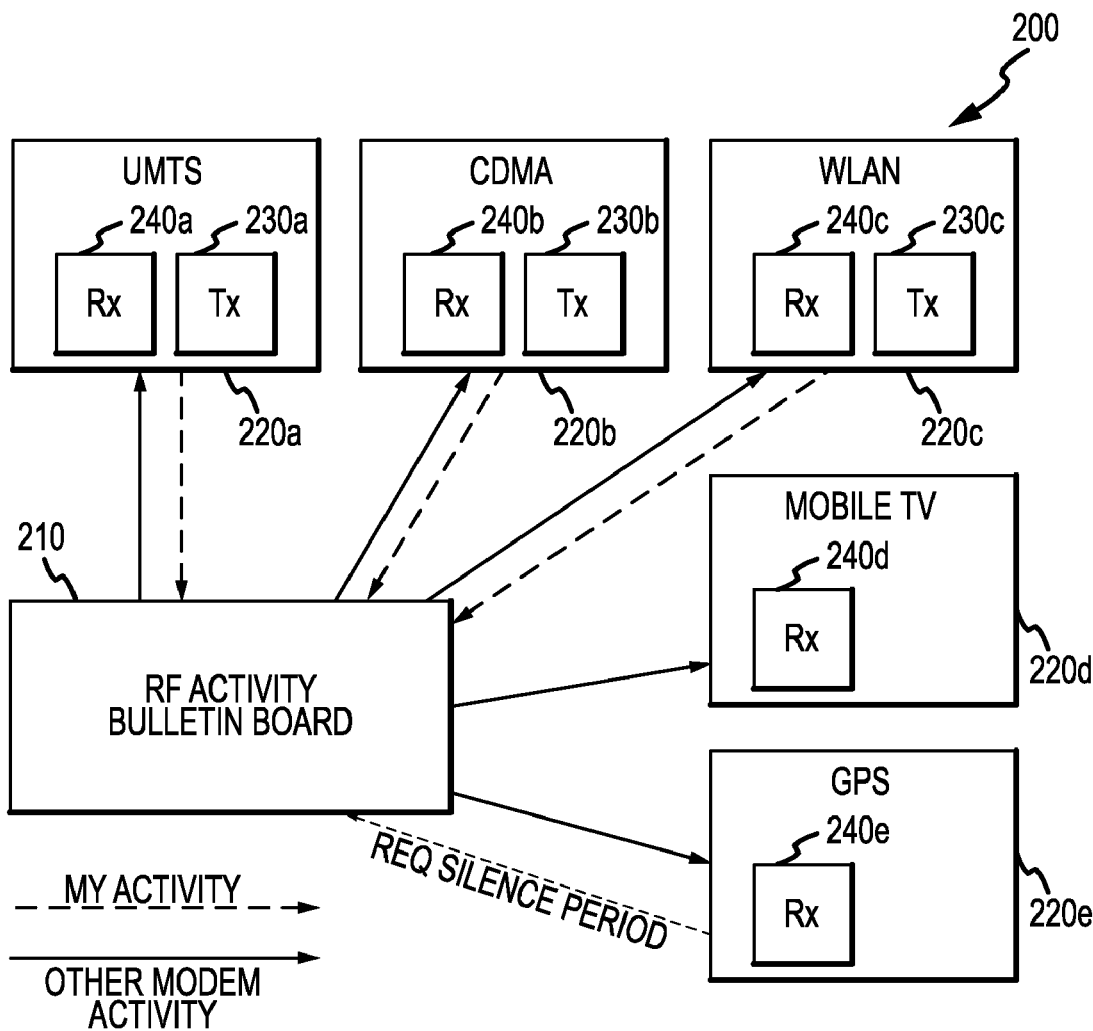
FIG. 2 shows an example of a wireless communication system comprising a single mobile terminal with a plurality of RF modules and an RF activity bulletin board.

FIG. 2 illustrates an example of a wireless communication system comprising a single mobile terminal 200 with a plurality of RF modules 220a, 220b, 220c, 220d, 220e and an RF activity bulletin board 210. In one example the plurality of RF modules are co-located on a single printed circuit board (PCB). The RF activity bulletin board 210 may or may not be co-located on the same PCB as the RF modules. The example RF modules 220a, 220b, 220c, 220d, 220e shown in FIG. 2 include UMTS, CDMA, WLAN, Mobile TV (or digital TV) and GPS. One skilled in the art would understand that the RF modules shown in FIG. 2 are only examples, and that other types and quantities of RF modules may be included and/or that one or more of the RF modules shown may be excluded without affecting the scope and spirit of the present disclosure.

As shown in FIG. 2, each RF module may include a receiver (RX) 240a, 240b, 240c, 240d, 240e and/or a transmitter (TX) 230a, 230b, 230c. The RF activity bulletin board 210 serves as a mediator among all RF modules within the mobile terminal 200. In one example, the RF activity bulletin board 210 sends notifications from one of the RF modules to one or more of the other RF modules within the mobile terminal 200. For example, a notification from one of the transmitters 230a, 230b, 230c is sent to one or more of the receivers 240a, 240b, 240c, 240d, 240e and/or one or more of the other transmitters which are registered for such information. Serving as a mediator, the RF activity bulletin board 210 decouples dependencies among the RF modules since the RF modules no longer need to directly communicate with each other. In particular, the hardware registers of the different RF modules are decoupled by having the RF activity bulletin board. In another aspect, the software (e.g., software functions calls) of the different RF modules are decoupled by having the RF activity bulletin board. With no direct inter-technology interaction and implementation of RF activity synchronization, interference is minimized. In one aspect, the RF activity bulletin board 210 is a singleton with two application programming interface (API) functions: to send notification on upcoming transmission and to allow RF modules to define their criteria for receiving notifications.

When the notification is received by the receivers, the notification can be used to reduce sensitivity to interference while preserving capacity to receive other information. Without such notification, the receivers could, for example, lose its ability to receive data due to the interference. The RF activity bulletin board 210 allows each of the RF modules within the mobile terminal 200 to post notifications of its RF activities. Each of the RF modules subscribe to the RF activity bulletin board 210 for receiving notifications. Additionally, each RF module can subscribe to be notified of particular types of RF activities. As part of the subscription, each RF module can provide a filter such that only notifications that pass the criteria of the filter will be relayed to the RF module. By providing the filter, power consumption of the RF activity bulletin board 210 is reduced since notification is limited to only the relevant RF modules. In one aspect, the RF activity bulletin board 210 is implemented by a processor of the mobile terminal 200. In the alternative, the RF activity bulletin board 210 is implemented by its own dedicated processor. By providing the filter, the power consumption of the processor is reduced. The criteria of the filter include one or more of the following parameters, type of technology, transmission start time, transmission end time, duration of the transmission, transmission power level, transmission frequency band, etc. One skilled in the art would understand that the parameters listed here serve only as examples, and that other parameters may be included without affecting the scope and spirit of the present disclosure.

For example, a transmitter within a RF module can notify the RF activity bulletin board 210 when it is going to transmit, its technology (e.g., CDMA), its transmit power and/or frequency band. Upon receiving the notification from the transmitter, the RF activity bulletin board 210 checks which receivers and/or transmitters have subscribed for that particular type of notification. In one aspect, each of the receivers/transmitters provides a filter to the RF activity bulletin board 210. The filter includes criteria for notifications. If the particular notification passes the criteria of the filter, then the corresponding receiver/transmitter to that filter desires to receive that notification. The RF activity bulletin board 210 then sends the notification to the receivers and/or transmitters which pass the filter criteria. For example, a receiver receives only in one frequency band. The filter criterion of this receiver is set to the one frequency band. Thus, notification that a transmitter will be transmitting in a different frequency band will not pass the criteria of the receiver's filter. Thus, in this case, the RF activity bulletin board 210 will not send the notification to this particular receiver.

Once the notification is received by the receivers and/or transmitters, appropriate actions can be taken. For example, a receiver may change its low noise amplifier (LNA) gain, increase its linear range, activate a notch filter and/or reschedule its reception time/activity, etc. The decision for the appropriate actions resides within the recipient of the notification.

Figure 3:
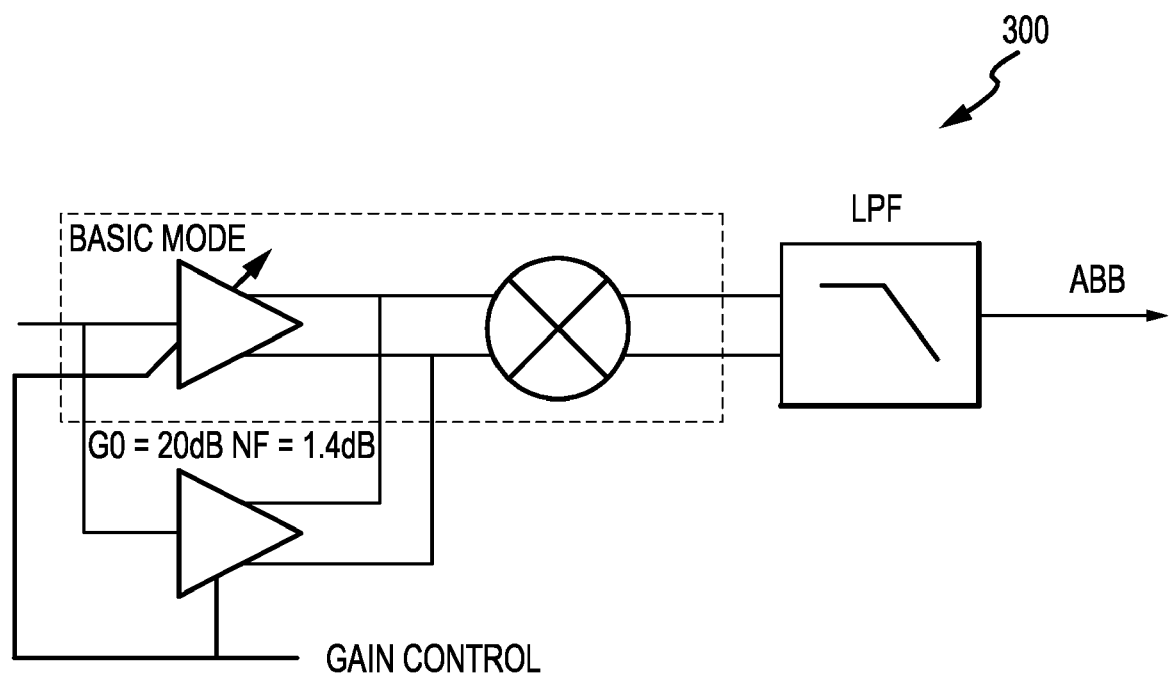
FIG. 3 shows an example of a digital TV receiver.

FIG. 3 shows an example of a digital TV receiver 300 which can be part of a RF module (not shown). In this example, the reception mode of the digital TV receiver 300 is designed with an improved signal-to-noise (SNR) and substantially lower power consumption. However, the drawback of the reception mode design includes high RF sensitivity to other RF transmissions (i.e., more vulnerability to interferences). In this example the RF activity bulletin board, through its notifications, enables the digital TV receiver 300 to benefit from its improved reception mode and to take necessary action to protect itself from other transmission interference when appropriate. Upon receiving the notification, the digital TV receiver, for example, can change its reception mode to accommodate the anticipated transmission by the other transmitter.

The RF activity bulletin board may be implemented in hardware, firmware, software or a combination thereof. In one aspect, the RF activity bulletin board includes one or more of the following characteristics mentioned herein. The RF activity bulletin board runs on a common software, firmware or hardware that is readily compatible with all technologies. The RF activity bulletin runs on a common software, firmware or hardware that is readily accessible by all technologies. In one aspect, the common software, firmware or hardware is temporarily accessible by a third party module during a temporary connection. The software, firmware or hardware of the RF activity bulletin board has the ability to gain access to all technologies so that it can receive and send notifications to all. The software, firmware or hardware of the RF activity bulletin board is fast and simple, and runs at high priority to allow receiving and sending notifications without delay. In one aspect, the RF activity bulletin board includes its own processor for faster response.

Figure 4:
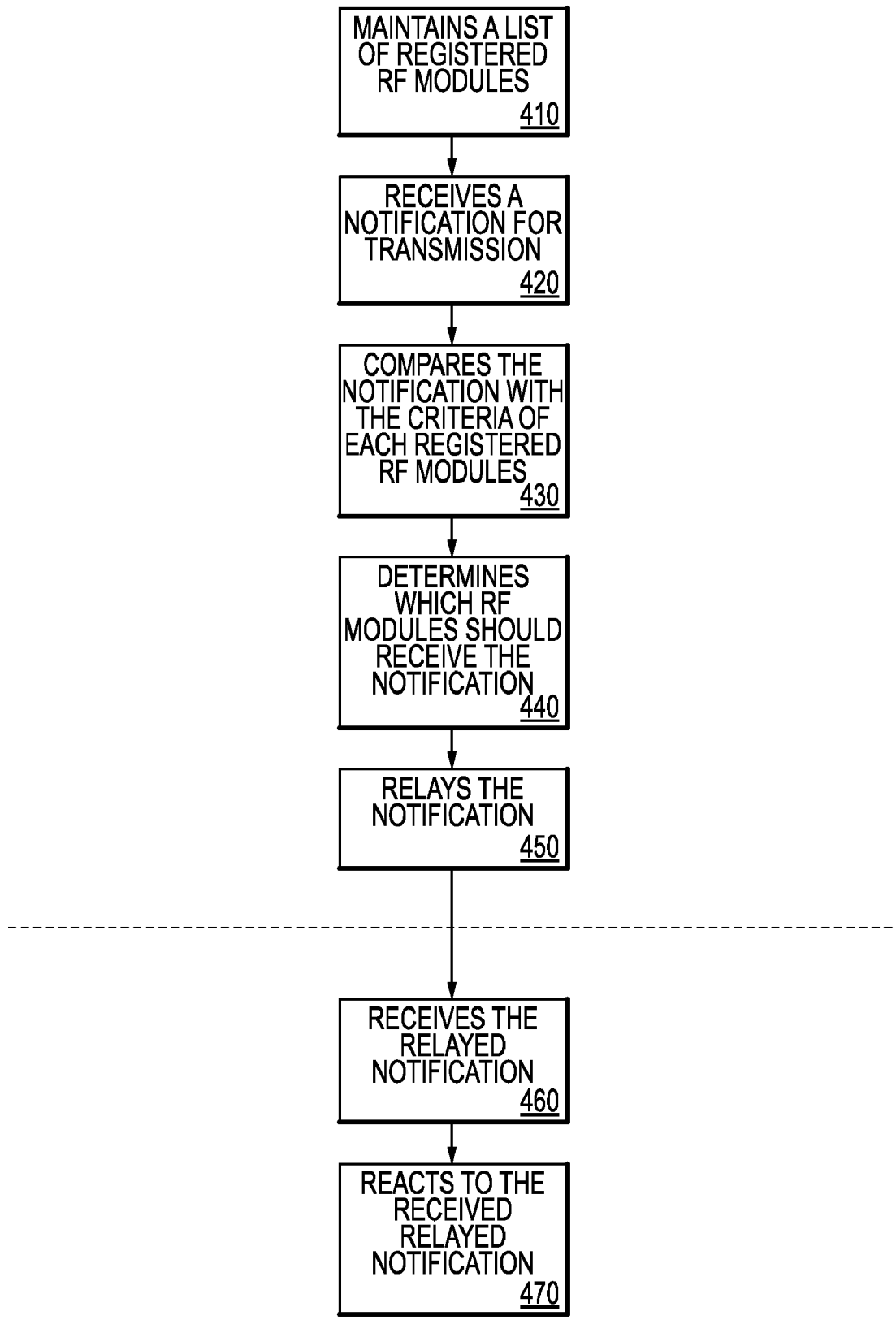
FIG. 4 is an example flow diagram for synchronizing RF module activities.

FIG. 4 is an example flow diagram for synchronizing RF module activities. In block 410, the RF activity bulletin board starts by maintaining a list of RF modules (a.k.a. "registered RF modules"). Each RF module can set a set of criteria for notification. For example, a RF module may be only interested in being notified of a transmission above a certain power level and/or in a particular frequency band. Once there is a list of registered RF modules, the RF activity bulletin board waits. In block 420, the RF activity bulletin board receives a notification for transmission from one of the RF modules. The structure of the notification includes one or more of the following parameters, type of technology, transmission start time, transmission end time, duration of the transmission, transmission power level, transmission frequency band, etc. One skilled in the art would understand that the parameters listed here serve only as examples, and that other parameters may be included or some of the parameters listed herein may be excluded without affecting the scope and spirit of the present disclosure.

Following block 420, in block 430, the RF activity bulletin board compares the notification with the criteria for notification from each of the registered RF modules in the list. Based on the comparisons, in block 440, the RF activity bulletin board determines which of the registered RF modules should receive the notification. In one aspect, each of the registered RF modules provides to the RF activity bulletin board a filter a priori. If a notification passes the criteria of the filter, the notification will be relayed to the associated RF module. Once it is determined which of the registered RF modules should receive the notification, the RF activity bulletin board relays the notification to each of those registered RF modules in block 450. If needed, the notification may be relayed to both or just one of the receiver and the transmitter in the RF module, depending on the criteria of the filter. In block 460, the RF module receives the notification. In block 470, the RF module takes appropriate actions based on the notification received, i.e., the RF modules reacts to the notification. For example, the RF module turns off its reception mode during transmission by the other RF module. In another example, the RF module modifies the sensitive of its reception mode to reduce interference from the transmission. One skilled in the art would understand that the examples given are not intended to be exclusive, and that many actions not mentioned herein may be appropriately taken by the RF modules without affecting the scope and spirit of the present disclosure.

Figure 5:
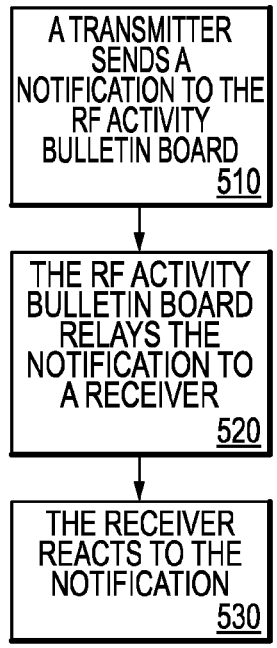
FIG. 5 is an example flow diagram showing a transmitter to receiver use case.

One of the more common use cases is for a transmitter in a first RF module to notify its planned transmission activity while a receiver in a second RF module reacts to that notification. FIG. 5 is an example flow diagram showing a transmitter to receiver use case. In block 510, a transmitter in a first RF module sends a notification to the RF activity bulletin board of a transmission activity. In block 520, the RF activity bulletin board relays the notification to a receiver in a second RF module. In block 530, upon receipt of the notification, the receiver reacts to the notification. Examples of how the receiver reacts include one or more of the following: configure a notch filter to the known spur due to the anticipated transmission; change the low noise amplifier (LNA) gain in the receiver, increase linearity and/or reschedule the receiver reception time, etc. One skilled in the art would understand that the examples given herein are not meant to be an exclusive list, and that other examples may be included or the examples mentioned herein excluded without affecting the scope and spirit of the present disclosure.

Figure 6:
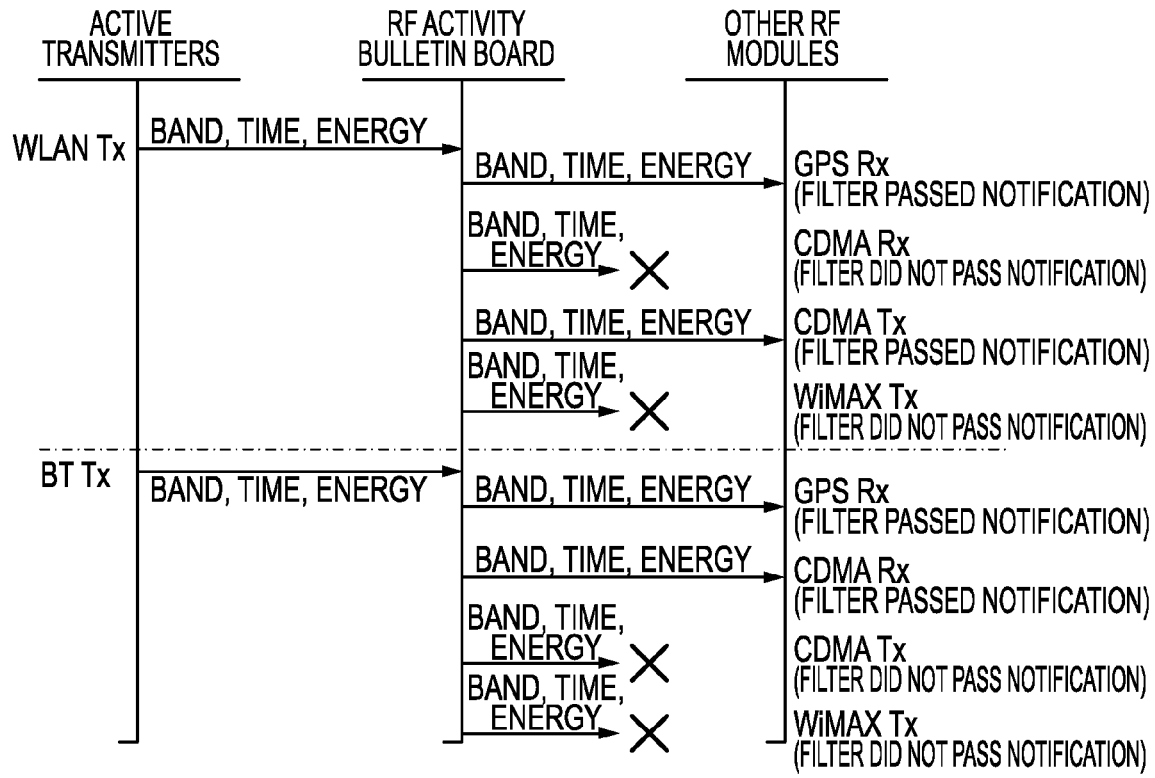
FIG. 6 is an example sequence diagram for the use case shown in FIG. 5.

FIG. 6 is an example sequence diagram for the use case shown in FIG. 5. In the example shown in FIG. 6, the transmission parameters for each of the active transmitters include type of technology, transmission start time, transmission end time, duration of the transmission, transmission power level, transmission frequency band, etc. Each of the RF modules (which may include a receiver and/or a transmitter within) can register with the RF activity bulletin board to receive notifications. Each RF module (or in the alternative, each receiver and/or transmitter within) can provide a filter with criteria for its notification. Additionally, a call back function is provided such that if the parameters of the notification pass the criteria of the filter, the notification is relayed to the RF module (or its receiver and/or transmitter) corresponding to that filter using the call back function.

Figure 7:
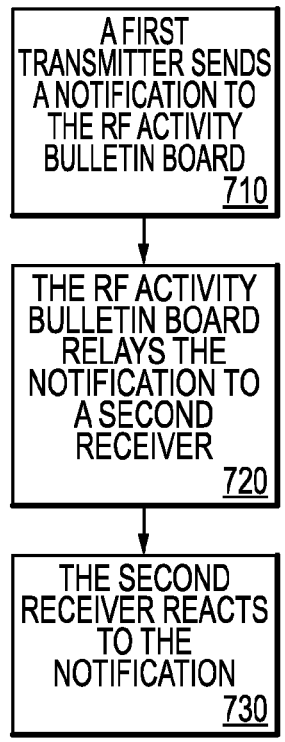
FIG. 7 is an example flow diagram showing a first transmitter to a second transmitter use case.

In another use case, a transmitter in a first RF module notifies its planned transmission activity while a second transmitter in a second RF module reacts to that notification. FIG. 7 is an example flow diagram showing a first transmitter to a second transmitter use case. In block 710, the first transmitter in a first RF module sends a notification to the RF activity bulletin board of a transmission activity. In block 720, the RF activity bulletin board relays the notification to a second transmitter in a second RF module. In block 730, upon receipt of the notification, the second transmitter reacts to the notification, for example, by rescheduling its transmission activities to avoid producing interference, to reduce simultaneous peak current demand and/or to reduce simultaneous peak power consumption (i.e., the peak power transmission is thereby reduced), etc. In one aspect, the "second transmitter" may be a plurality of transmitters, each within an RF module.

Figure 8:
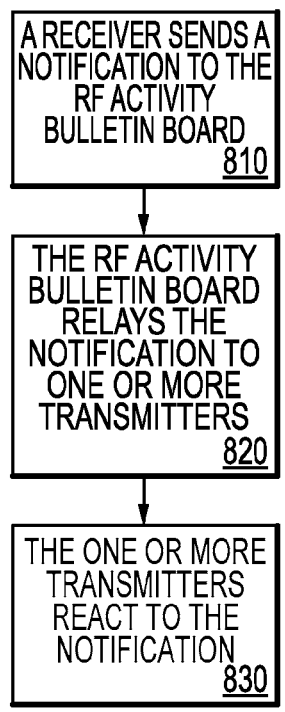
FIG. 8 is an example flow diagram showing a receiver to transmitters use case.

In another use case, a receiver in a first RF module notifies its planned reception activity to request that other transmitters in the other RF modules reschedule their transmission activities. FIG. 8 is an example flow diagram showing a receiver to transmitters use case. In block 810, a receiver in a RF module sends a notification to the RF activity bulletin board requesting that one or more transmitters reschedule their transmission activities. In one aspect, the notification includes a defined clean period with no transmission activities. In block 820, the RF activity bulletin board relays the notification to the one or more transmitters. In block 830, upon receipt of the notification, the transmitters react to the notification, for example, by rescheduling their transmission activities away from the clean period (i.e., not during the duration of the clean period) or by sending an advanced notification of upcoming known transmission activities.

Figure 9:
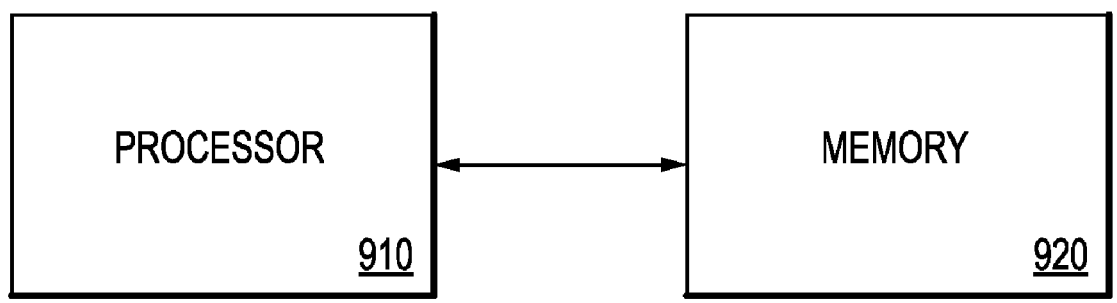
FIG. 9 shows an example of a device comprising a processor in communication with a memory for executing synchronization of RF module activities.

One skilled in the art would understand that the processes and modules described herein may be implemented by various ways such as hardware, firmware, software or a combination thereof. The various illustrative flow diagrams, logical blocks, modules, and/or circuits described herein may be implemented or performed with one or more processors. In one aspect, a processor is coupled with a memory which stores data, meta data, program instructions, etc. to be executed by the processor for implementing or performing the various flow diagrams, logical blocks, modules, and/or circuits described herein. FIG. 9 shows an example of a device 900 comprising a processor 910 in communication with a memory 920 for executing synchronization of RF module activities In one example, the device 900 is used to implement the processes illustrated in FIGS. 4-8. In one aspect, the memory 920 is located within the processor 910. In another aspect, the memory 920 is external to the processor 910.

A processor may be a general purpose processor, such as a microprocessor, a specific application processor, such a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuit (ASIC), a programmable logic device (PLD), a field programmable gate array (FPGA), a controller, a microcontroller, a state machine, a combination of discrete hardware components, or any combination thereof. With software, the implementation may be through modules (e.g., procedures, functions, etc.) that perform the functions described therein. The various illustrative flow diagrams, logical blocks, modules, and/or circuits described herein may also implemented by software codes. The software codes may be stored in memory units and executed by one or more processors. The various illustrative flow diagrams, logical blocks, modules, and/or circuits described herein may also include computer readable medium for storing software. The computer readable medium may also include one or more storage devices, a transmission line, or a carrier wave that encodes a data signal.

Figure 10:
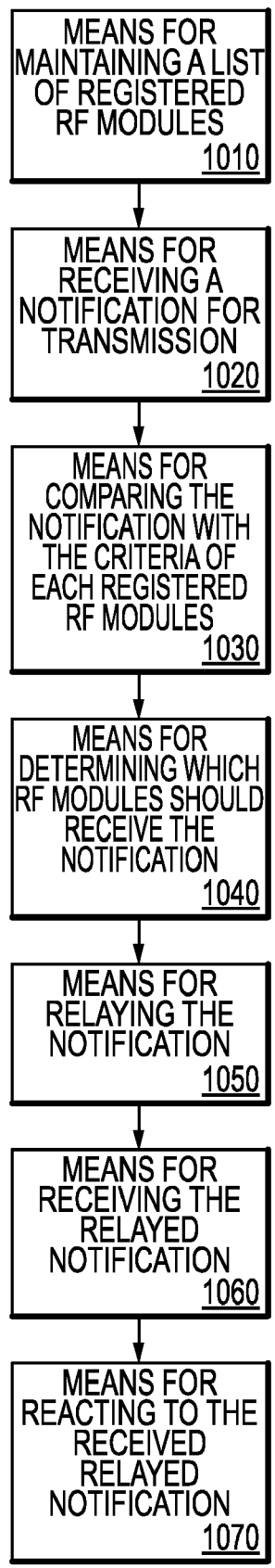
FIG. 10 shows an example of a device with features for synchronizing RF module activities.

FIG. 10 shows an example of a device 1000 with features for synchronizing RF module activities. In one aspect, the device 1000 is implemented by at least one processor comprising one or more modules configured to provide different aspects of synchronizing RF module activities as described herein in blocks 1010, 1020, 1030, 1040, 1050, 1060 and 1070. For example, each module comprises hardware, firmware, software, or any combination thereof. In one aspect, the device 1000 is also implemented by at least one memory in communication with the at least one processor.

One skilled in the art would understand that the techniques described herein may also be coded as computer-readable instructions carried on any computer-readable medium known in the art. In this specification and the appended claims, the term "computer-readable medium" refers to any medium that participates in providing instructions to any processor, such as but not limited to the processor 910 shown and described in FIG. 9 or the processor(s) described in FIG. 10 for execution. In one aspect, such a medium is of the storage type and takes the form of a volatile or non-volatile storage medium, for example, as in the memory 920 in FIG. 9 or the memory described in FIG. 10. In one aspect, such a medium is of the transmission type and includes a coaxial cable, a copper wire, an optical cable, and the air interface carrying acoustic, electromagnetic or optical waves capable of carrying signals readable by machines or computers. In the present disclosure, signal-carrying waves, unless specifically identified, are collectively called medium waves which include optical, electromagnetic, and acoustic waves.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for synchronizing RF activities in a mobile terminal comprising:
   receiving a notification from relating to transmission activities in an RF activity bulletin board, which is configured to mediate among a plurality of RF modules within the mobile terminal;
   determining at least one of the plurality of RF modules to relay the notification;
   relaying the notification to at least one of the plurality of RF modules with the RF activity bulletin board, wherein the at least one of the plurality of RF modules provides a filter comprising criteria for notification such that only notifications that pass the criteria of the filter will be relayed to the RF module; and
   maintaining a list of the plurality of RF modules in the RF activity bulletin board.

2. The method of claim 1 wherein the list comprises criteria for notification for each of the plurality of RF modules.

3. The method of claim 2 wherein the criteria comprises one or more of the following parameters: technology type, transmission start time, transmission end time, duration of the transmission, transmission power level or transmission frequency band.

4. The method of claim 2 further comprising comparing the notification with the criteria for each of the plurality of RF modules.

5. The method of claim 4 wherein determining at least one of a plurality of RF modules to relay the notification uses comparison results from comparing the notification with the criteria for each of the plurality of RF modules.

6. The method of claim 1 wherein the notification comprises one or more of the following parameters: technology type, transmission start time, transmission end time, duration of the transmission, transmission power level or transmission frequency band.

7. The method of claim 1 further comprising receiving the notification that had been relayed and reacting to the notification that had been relayed.

8. The method of claim 7 wherein the reacting step comprises one or more of the following: changing LNA gain, increasing linearity, rescheduling reception time, turning off reception mode or modifying reception mode sensitivity to interference.

9. The method of claim 7 wherein at least one of the plurality of RF modules comprises a receiver, and at least one other of the plurality of RF modules comprises a transmitter.

10. The method of claim 9 wherein the transmitter generates the notification.

11. The method of claim 10 wherein the receiver receives the notification and reacts to the notification.

12. The method of claim 11 wherein the receiver reacts to the notification by one or more of the following: changes low noise amplifier (LNA) gain, increases linearity, activates a notch filter, reschedules reception time, turns off reception mode or modifies reception mode sensitivity to interference.

13. The method of claim 9 wherein the receiver generates the notification, and the notification comprises a request for a clean period with no transmission activities.

14. The method of claim 13 wherein the transmitter receives the notification and reacts to the notification by scheduling its transmission activity not during the duration of the clean period or by sending an advance notification of upcoming known transmission activities.

15. The method of claim 7 wherein at least one of the plurality of RF modules comprises a first transmitter, and at least one other of the plurality of RF modules comprises a second transmitter.

16. The method of claim 15 wherein the first transmitter generates the notification.

17. The method of claim 16 wherein the second transmitter receives the notification and reacts to the notification by rescheduling its transmission activities or by reducing its peak power consumption.

18. The method of claim 1 wherein at least one of the plurality of RF modules uses one or more of the following technologies: Bluetooth, Global Positioning System (GPS), Near Field Communications (NFC), Universal Mobile Telecommunications Systems (UMTS), Code Division Multiple Access (CDMA), Code Division Multiple Access/Universal Mobile Telecommunications Systems/Global System for Mobile communications (CDMA/UMTS/GSM), Evolution Data Optimized/High Speed Packet Access (EVDO/HSPA), Wi-Fi™, Ultra Wide Band (UWB), Digital TV, FM Radio, Worldwide Interoperability for Microwave Access (WiMAX), or wireless local area networks (WLAN).

19. The method of claim 1 wherein the plurality of RF modules are co-located in a single printed circuit board (PCB).

20. The method of claim 19 wherein the RF activity bulletin board is co-located in the single printed circuit board (PCB) with the plurality of RF modules.

21. The method of claim 1 wherein the RF activity bulletin board comprises a dedicated processor.

22. A mobile terminal with features for synchronizing RF activities comprising:
a plurality of RF modules; and
an RF activity bulletin board configured to mediate among the plurality of RF modules within the mobile terminal wherein the RF activity bulletin board receives a notification relating to transmission activities, determines at least one of the plurality of RF modules to relay the notification, and relays the notification to at least one of the plurality of RF modules, wherein the at least one of the plurality of RF modules provides a filter comprising criteria for notification such that only notifications that pass the criteria of the filter will be relayed to the RF module.

23. The mobile terminal of claim 22 wherein the RF activity bulletin board maintains a list of the plurality of RF modules.

24. The mobile terminal of claim 23 wherein the list comprises criteria for notification for each of the plurality of RF modules.

25. The mobile terminal of claim 24 wherein the criteria comprises one or more of the following parameters: technology type, transmission start time, transmission end time, duration of the transmission, transmission power level or transmission frequency band.

26. The mobile terminal of claim 24 wherein the RF activity bulletin board compares the notification with the criteria for each of the plurality of RF modules.

27. The mobile terminal of claim 26 wherein the RF activity bulletin board uses comparison results of the notification and the criteria in determining at least one of the plurality of RF modules to relay the notification.

28. The mobile terminal of claim 22 wherein the notification comprises one or more of the following parameters: technology type, transmission start time, transmission end time, duration of the transmission, transmission power level or transmission frequency band.

29. The mobile terminal of claim 22 wherein one of the plurality of RF modules receives the notification that had been relayed and reacts to the notification that had been relayed.

30. The mobile terminal of claim 22 wherein one of the plurality of RF modules comprises a receiver to receive the notification that had been relayed, and another one of the plurality of RF modules comprises a transmitter.

31. The mobile terminal of claim 30 wherein the transmitter generates the notification.

32. The mobile terminal of claim 31 wherein the receiver reacts to the notification by one or more of the following: changes low noise amplifier (LNA) gain, increases linearity, activates a notch filter, reschedules reception time, turns off reception mode or modifies reception mode sensitivity to interference.

33. The mobile terminal of claim 22 wherein one of the plurality of RF modules comprises a receiver and another one of the plurality of RF modules comprises a transmitter.

34. The mobile terminal of claim 33 wherein the receiver generates the notification, and the notification comprises a request for a clean period with no transmission activities.

35. The mobile terminal of claim 34 wherein the transmitter receives the notification and reacts to the notification by scheduling its transmission activity not during the duration of the clean period or by sending an advance notification of upcoming known transmission activities.

36. The mobile terminal of claim 22 wherein one of the plurality of RF modules comprises a first transmitter, and another of the plurality of RF modules comprises a second transmitter.

37. The mobile terminal of claim 36 wherein the first transmitter generates the notification.

38. The mobile terminal of claim 37 wherein the second transmitter receives the notification and reacts to the notification by rescheduling its transmission activities or by reducing its peak power consumption.

39. The mobile terminal of claim 22 wherein at least one of the plurality of RF modules uses one or more of the following technologies: Bluetooth, Global Positioning System (GPS), Near Field Communications (NFC), Universal Mobile Telecommunications Systems (UMTS), Code Division Multiple Access (CDMA), Code Division Multiple Access/Universal Mobile Telecommunications Systems/Global System for Mobile communications (CDMA/UMTS/GSM), Evolution Data Optimized/High Speed Packet Access (EVDO/HSPA), Wi-Fi™, Ultra Wide Band (UWB), Digital TV, FM Radio, Worldwide Interoperability for Microwave Access (WiMAX), or wireless local area networks (WLAN).

40. The mobile terminal of claim 22 wherein the plurality of RF modules are co-located in a single printed circuit board (PCB).

41. The mobile terminal of claim 40 wherein the RF activity bulletin board is co-located in the single printed circuit board (PCB) with the plurality of RF modules.

42. The mobile terminal of claim 22 wherein the RF activity bulletin board comprises a dedicated processor.

43. A mobile terminal with features for synchronizing RF activities comprising a processor and a memory wherein the memory containing program code executable by the processor for performing the following:
   receiving a notification relating to transmission activities in an RF activity bulletin board, which is configured to mediate among a plurality of RF modules within the mobile terminal;
   determining at least one of the plurality of RF modules to relay the notification; and
   relaying the notification to at least one of the plurality of RF modules, wherein the at least one of the plurality of RF modules provides a filter comprising criteria for notification such that only notifications that pass the criteria of the filter will be relayed to the RF module.

44. The mobile terminal of claim 43 wherein the memory further comprises program code for maintaining a list of the plurality of RF modules.

45. The mobile terminal of claim 44 wherein the list comprises criteria for notification for each of the plurality of RF modules.

46. The mobile terminal of claim 45 wherein the criteria comprises one or more of the following parameters: technology type, transmission start time, transmission end time, duration of the transmission, transmission power level or transmission frequency band.

47. The mobile terminal of claim 45 wherein the memory further comprises program code for comparing the notification with the criteria for each of the plurality of RF modules.

48. The mobile terminal of claim 47 wherein the program code for determining further comprises program code for using comparison results.

49. The mobile terminal of claim 43 wherein the notification comprises one or more of the following parameters: technology type, transmission start time, transmission end time, duration of the transmission, transmission power level or transmission frequency band.

50. The mobile terminal of claim 43 wherein the memory further comprises program code for receiving the notification that had been relayed and program code for reacting to the notification that had been relayed.

51. The mobile terminal of claim 50 wherein the program code for reacting further comprises program code for one or more of the following: changing low noise amplifier (LNA) gain, increasing linearity, activating a notch filter rescheduling reception time, turning off reception mode or modifying reception mode sensitivity to interference.

52. The mobile terminal of claim 50 wherein at least one of the plurality of RF modules comprises a receiver, and at least one other of the plurality of RF modules comprises a transmitter.

53. The mobile terminal of claim 52 wherein the transmitter generates the notification.

54. The mobile terminal of claim 53 wherein the receiver receives the notification and reacts to the notification.

55. The mobile terminal of claim 54 wherein the receiver reacts to the notification by one or more of the following: changes low noise amplifier (LNA) gain, increases linearity, activates a notch filter, reschedules reception time, turns off reception mode or modifies reception mode sensitivity to interference.

56. The mobile terminal of claim 52 wherein the receiver generates the notification, and the notification comprises a request for a clean period with no transmission activities.

57. The mobile terminal of claim 56 wherein the transmitter receives the notification and reacts to the notification by scheduling its transmission activity not during the duration of the clean period or by sending an advance notification of upcoming known transmission activities.

58. The mobile terminal of claim 50 wherein at least one of the plurality of RF modules comprises a first transmitter, and at least one other of the plurality of RF modules comprises a second transmitter.

59. The mobile terminal of claim 58 wherein the first transmitter generates the notification.

60. The mobile terminal of claim 59 wherein the second transmitter receives the notification and reacts to the notification by rescheduling its transmission activities or by reducing its peak power consumption.

61. The mobile terminal of claim 43 wherein at least one of the plurality of RF modules uses one or more of the following technologies: Bluetooth, Global Positioning System (GPS), Near Field Communications (NFC), Universal Mobile Telecommunications Systems (UMTS), Code Division Multiple Access (CDMA), Code Division Multiple Access/Universal Mobile Telecommunications Systems/Global System for Mobile communications (CDMA/UMTS/GSM), Evolution Data Optimized/High Speed Packet Access (EVDO/HSPA), Wi-Fi™, Ultra Wide Band (UWB), Digital TV, FM Radio, Worldwide Interoperability for Microwave Access (WiMAX), or wireless local area networks (WLAN).

62. The mobile terminal of claim 43 wherein the plurality of RF modules are co-located in a single printed circuit board (PCB).

63. The mobile terminal of claim 62 wherein the RF activity bulletin board is co-located in the single printed circuit board (PCB) with the plurality of RF modules.

64. The mobile terminal of claim 43 wherein the RF activity bulletin board comprises a dedicated processor.

65. A mobile terminal with features for synchronizing RF activities comprising:
   means for receiving a notification relating to transmission activities, the means including an RF activity bulletin board that is configured to mediate among a plurality of RF modules within the mobile terminal;
   means for determining at least one of the plurality of RF modules to relay the notification; and
   means for relaying the notification to at least one of the plurality of RF modules, wherein the at least one of the plurality of RF modules provides a filter comprising criteria for notification such that only notifications that pass the criteria of the filter will be relayed to the RF module.

66. The mobile terminal of claim 65 wherein the RF activity bulletin board is further configured to maintain a list of the plurality of RF modules.

67. The mobile terminal of claim 66 wherein the list comprises criteria for notification for each of the plurality of RF modules, and wherein the criteria comprises one or more of the following parameters: technology type, transmission start time, transmission end time, duration of the transmission, transmission power level or transmission frequency band.

68. The mobile terminal of claim 67 further comprising means for comparing the notification with the criteria for each of the plurality of RF modules.

69. The mobile terminal of claim 65 wherein the notification comprises one or more of the following parameters: technology type, transmission start time, transmission end time, duration of the transmission, transmission power level or transmission frequency band.

70. The mobile terminal of claim 65 further comprising means for receiving the notification that had been relayed and means for reacting to the notification that had been relayed.

71. The mobile terminal of claim 70 wherein the means for reacting executes one or more of the following: changing LNA gain, increasing linearity, rescheduling reception time, turning off reception mode or modifying reception mode sensitivity to interference.

72. A non-transitory computer-readable medium including program code thereon, which when executed by at least one computer implement a method comprising:
  program code for receiving a notification relating to transmission activities in an RF activity bulletin board, which is configured to mediate among a plurality of RF modules within a mobile terminal;
  program code for determining at least one of the plurality of RF modules to relay the notification;
  program code for relaying the notification to at least one of the plurality of RF modules, wherein the at least one of the plurality of RF modules provides a filter comprising criteria for notification such that only notifications that pass the criteria of the filter will be relayed to the RF module; and
  program code for causing a list to be maintained of the plurality of RF modules.

73. The non-transitory computer-readable medium of claim 72 further comprising program code for maintaining a list of the plurality of RF modules.

74. The non-transitory computer-readable medium of claim 73 wherein the list comprises criteria for notification for each of the plurality of RF modules, and wherein the criteria comprises one or more of the following parameters: technology type, transmission start time, transmission end time, duration of the transmission, transmission power level or transmission frequency band.

75. The non-transitory computer-readable medium of claim 74 further comprising program code for comparing the notification with the criteria for each of the plurality of RF modules.

76. The non-transitory computer-readable medium of claim 72 wherein the notification comprises one or more of the following parameters: technology type, transmission start time, transmission end time, duration of the transmission, transmission power level or transmission frequency band.

77. The non-transitory computer-readable medium of claim 72 further comprising program code for receiving the notification that had been relayed and program code for reacting to the notification that had been relayed.

* * * * *